US008804171B2

(12) United States Patent

Suzuki

(10) Patent No.: US 8,804,171 B2
(45) Date of Patent: Aug. 12, 2014

(54) PRINTING APPARATUS AND PRINTING SYSTEM

(75) Inventor: Masataka Suzuki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 397 days.

(21) Appl. No.: 13/069,876

(22) Filed: Mar. 23, 2011

(65) Prior Publication Data

US 2011/0255127 A1 Oct. 20, 2011

(30) Foreign Application Priority Data

Apr. 15, 2010 (JP) ................................ 2010-094064

(51) Int. Cl.

*G06F 3/12* (2006.01)
*H04N 1/60* (2006.01)
*G06F 15/00* (2006.01)
*G03G 15/00* (2006.01)
*G03G 15/01* (2006.01)
*B41J 2/15* (2006.01)
*B41J 2/01* (2006.01)

(52) U.S. Cl.

USPC ......... 358/1.15; 358/1.9; 358/1.14; 358/1.13; 347/85; 347/7; 399/1; 399/39

(58) Field of Classification Search

USPC ........ 358/1.15, 1.9, 1.14, 1.13; 399/81, 1, 39; 347/85, 7

See application file for complete search history.

(56) References Cited

U.S. PATENT DOCUMENTS 5,534,974 A * 7/1996 Hasegawa ......................... 399/1
6,195,170 B1 2/2001 Mizutani et al.
6,494,553 B1 * 12/2002 Donahue et al. .................. 347/7
7,889,388 B2 * 2/2011 Kaneko et al. ................. 358/1.9
8,379,243 B2 * 2/2013 Ferlitsch et al. ............. 358/1.15
2002/0015083 A1 * 2/2002 Thorpe et al. .................... 347/85
2005/0018230 A1 * 1/2005 Green et al. ................. 358/1.13
2005/0151764 A1 * 7/2005 Grady et al. ...................... 347/7

(Continued)

FOREIGN PATENT DOCUMENTS

JP 07-121331 A 5/1995
JP 07-250190 A 9/1995

(Continued)

OTHER PUBLICATIONS

JP Office Action dtd Feb. 28, 2012, JP Appln. 2010-094064, English translation.

(Continued)

*Primary Examiner* — Akwasi M Sarpong
(74) *Attorney, Agent, or Firm* — Banner & Witcoff, Ltd.

(57) ABSTRACT

A printing apparatus capable of processing a print job and forming an image on a recording sheet based on the print job is provided. The printing apparatus includes a first determining system to examine an image-forming condition of the printing apparatus and determine as to whether the printing apparatus is under a condition of lowered image-forming quality, a second determining system to examine attribute of the print job and determine based on the attribute as to whether the print job meets restrictive requirement, by which the print job is restricted from being executed, when the printing apparatus is under the condition of lowered image-forming quality, and a restricting system to restrict execution of the print job at least partially when the second determining system determines that the print job meets the restrictive requirement.

9 Claims, 7 Drawing Sheets

(56) References Cited

U.S. PATENT DOCUMENTS

| | | | | |
|---|---|---|---|---|
| 2005/0151801 | A1* | 7/2005 | Neese et al. | 347/85 |
| 2006/0250425 | A1* | 11/2006 | Nambudiri et al. | 347/7 |
| 2007/0058188 | A1* | 3/2007 | Nakahara | 358/1.13 |
| 2007/0211277 | A1* | 9/2007 | Kaneko et al. | 358/1.14 |
| 2008/0068639 | A1* | 3/2008 | Satoh et al. | 358/1.14 |
| 2008/0165214 | A1* | 7/2008 | Yuen | 347/7 |
| 2009/0303530 | A1* | 12/2009 | Honma et al. | 358/1.15 |
| 2010/0021188 | A1 | 1/2010 | Mizumukai | |
| 2011/0076039 | A1* | 3/2011 | Nakajima | 399/39 |

FOREIGN PATENT DOCUMENTS

| | | | |
|---|---|---|---|
| JP | 07-299936 | | 11/1995 |
| JP | 10-341308 | A | 12/1998 |
| JP | 11-032139 | A | 2/1999 |
| JP | 2001-343872 | | 12/2001 |
| JP | 2002-127570 | A | 5/2002 |
| JP | 2002-154691 | A | 5/2002 |
| JP | 2002-207399 | A | 7/2002 |
| JP | 2004-002046 | A | 1/2004 |
| JP | 2004-021049 | A | 1/2004 |
| JP | 2005-037918 | A | 2/2005 |
| JP | 2005-094524 | | 4/2005 |
| JP | 2005-254822 | A | 9/2005 |
| JP | 2005-262640 | A | 9/2005 |
| JP | 2005-306043 | A | 11/2005 |
| JP | 2006-035809 | A | 2/2006 |
| JP | 2006-298652 | A | 11/2006 |
| JP | 2007-243388 | A | 9/2007 |
| JP | 2007-320150 | A | 12/2007 |
| JP | 2008-102470 | A | 5/2008 |
| JP | 2009-020284 | A | 1/2009 |
| JP | 2009-296212 | | 12/2009 |
| JP | 2010-009244 | | 1/2010 |
| JP | 2010-032705 | A | 2/2010 |
| JP | 2010-086555 | A | 4/2010 |

OTHER PUBLICATIONS

Notification of First Office Action issued in corresponding Chinese Patent Application No. 201110072734.7 dated Mar. 11, 2013.

Notification of First Office Action issued in corresponding Chinese Patent Application No. 201110045192.4 dated Apr. 17, 2013.

Notification of Reasons for Rejection in corresponding Japanese Patent Application No. 2010-094064 mailed Jul. 31, 2012.

Notification of Reasons for Rejection for corresponding Japanese Patent Application No. 2010-078890 mailed Dec. 20, 2011.

Notice of Allowance for related U.S. Appl. No. 12/986,216 mailed Oct. 26, 2012.

Notification of the Second Office Action issued in corresponding Chinese Patent Application No. 201110072734.7 issued Sep. 11, 2013.

* cited by examiner

320

321

| | |
|---|---|
| MANUAL INLET | RESTRICTED |
| #1 SHEET CASSETTE | ALLOWED |
| #2 SHEET CASSETTE | ALLOWED |

322

| | |
|---|---|
| MANUAL INLET | RESTRICTED |
| A4 | ALLOWED |
| B4 | ALLOWED |
| B5 | ALLOWED |
| LEGAL | RESTRICTED |

323

| | |
|---|---|
| REGULAR SHEET | ALLOWED |
| CARDBOARD SHEET | RESTRICTED |
| OHP SHEET | RESTRICTED |

FIG. 4

PRINTING APPARATUS AND PRINTING SYSTEM

CROSS REFERENCE TO RELATED APPLICATION

This application claims priority from Japanese Patent Application No. 2010-094064, filed on Apr. 15, 2010, the entire subject matter of which is incorporated herein by reference.

BACKGROUND

1. Technical Field

An aspect of the present invention relates to a printing apparatus and a printing system.

2. Related Art

An image-print quality of a printing apparatus may partially or largely depend on conditions surrounding the printing apparatus. For example, when a level of a colorant remaining in the printing apparatus is lowered, an image may be printed in an insufficient amount of the colorant, and a user may consider the image incomplete or undesirably unclear. On the other hand, even when the printing condition of the printing apparatus is lowered, the user may wish to have an image printed in the lower-conditioned printing apparatus when, for example, the user wishes to fully use of the colorant. In such a case, however, the printing apparatus may not necessarily provide a higher image-forming quality, and the printed image may not appear satisfactory to the user.

In order to deal with lowered condition of a printing apparatus, for example, a facsimile machine which reserves print data even after completion of a printing operation is suggested. The facsimile machine can examine past printing behaviors of the facsimile machine itself and reserve the print data if the past behaviors indicate probability of troubles so that the reserved print data is used once again when the trouble is cleared.

SUMMARY

In the above-mentioned printing apparatus, however, the recording sheet once used in the troubled printing operation is occupied by the incomplete image and not reusable. Therefore, in many cases, the misprinted recording sheets are discarded to be wasted. Specifically, waste of fine-quality recording sheets or recording sheets of specific materials may cause greater loss.

In view of the above inconvenience, the present invention is advantageous in providing a printing apparatus and a printing system, which can prevent the recording sheets from being unnecessarily wasted.

According to an aspect of the present invention, a printing apparatus capable of processing a print job and forming an image on a recording sheet based on the print job is provided. The printing apparatus includes a first determining system, which is configured to examine a printing condition of the printing apparatus and determine as to whether the printing apparatus is under a condition of lowered image-forming quality, a second determining system, which is configured to examine attribute of the print job and determine based on the attribute as to whether the print job meets restrictive requirement, by which the print job is restricted from being executed, when the printing apparatus is under the condition of lowered image-forming quality, and a restricting system, which is configured to restrict execution of the print job at least partially when the second determining system determines that the print job meets the restrictive requirement.

According to an aspect of the present invention, a printing system having an information transmitting device and a printing apparatus capable of processing a print job transmitted from the information transmitting device and forming an image on a recording sheet based on the print job is provided. The printing system includes a first determining system, which is configured to examine an image-forming condition of the printing apparatus and determine as to whether the printing apparatus is under a condition of lowered image-forming quality, a second determining system, which is configured to examine attribute of the print job and determine based on the attribute as to whether the print job meets restrictive requirement, by which the print job is restricted from being executed, when the printing apparatus is determined to be under the condition of lowered image-forming quality, and a restricting system, which is configured to restrict execution of the print job when the second determining system determines that the print job meets the restrictive requirement.

BRIEF DESCRIPTION OF THE ACCOMPANYING DRAWINGS

FIG. 4 illustrates a database, in which restriction and allowance settings of recording sheets are stored, in the MFP according to the embodiment of the present invention.

DETAILED DESCRIPTION

Hereinafter, an embodiment of the present invention will be described with reference to the accompanying drawings. The MFP 100 is a multifunction peripheral device equipped with a plurality of functions including a printing function, a facsimile transmission function, and a scanning function.

Overall Configuration of the MFP

Figure 1:
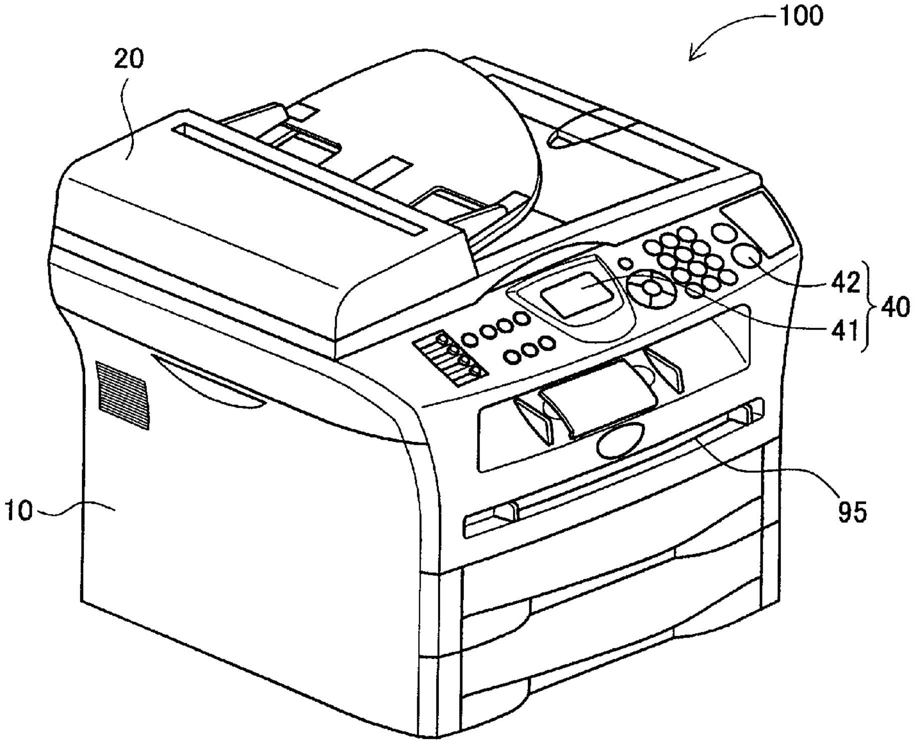
FIG. 1 is a perspective view of an MFP (multifunction peripheral) according to an embodiment of the present invention.

The MFP 100 (see FIG. 1) according to the present embodiment includes an image forming unit 10, which forms an image on a recording sheet, and an image reading unit 20, which reads an image printed on a sheet. The MFP 100 is provided with a manual-feed inlet 95, through which manually set recording sheets are fed to the MFP 100. The MFP 100 has an operation panel 40, through which information concerning operations of the MFP 100 is displayed and user's input is entered, on an upper front of the image reading unit 20. The operation panel 40 includes a display unit 41 being a liquid crystal display and buttons 42 including a start key, a stop key, and numerical keys (not shown).

Configuration of the Image Forming Unit in Detail

The image forming unit 10 (see FIG. 2) includes a processing unit 50, a fixing unit 8, sheet cassettes 91A, 91B, and a discharge tray 92. The processing unit 50 develops toner images and transfers the toner images onto the sheet being conveyed. The fixing unit 8 fixes the toner transferred to the sheet thereto. The sheet cassettes 91A, 91B are containers to store unused new sheets in stacks. The discharge tray 92 is a tray, in which ejected sheets with images printed thereon are settled. The image reading unit 20 is arranged on an upper position with respect to the image forming unit 10.

The processing unit 50 includes four (4) processors 50Y, 50M, 50C, 50K aligned in line, which enable image forming in colors. In particular, the processor 50Y forms an image in yellow, the processor 50M forms an image in magenta, the processor 50C forms an image in cyan, and the processor 50K forms an image in black. The processing unit 50 further includes an exposure unit 53, which emits beams to the processors 50Y, 50M, 50C, 50K, and a conveyer belt 7.

The conveyer belt 7 is an en endless belt made of resin such as polycarbonate. The conveyer belt 7 extends to roll around conveyer rollers 73, 74. When the conveyer roller 74 rotates in a counterclockwise direction (in FIG. 2), the conveyer belt 7 rolls accordingly to convey the recording sheet to pass by the processors 50Y, 50M, 50C, 50K.

Figure 2:
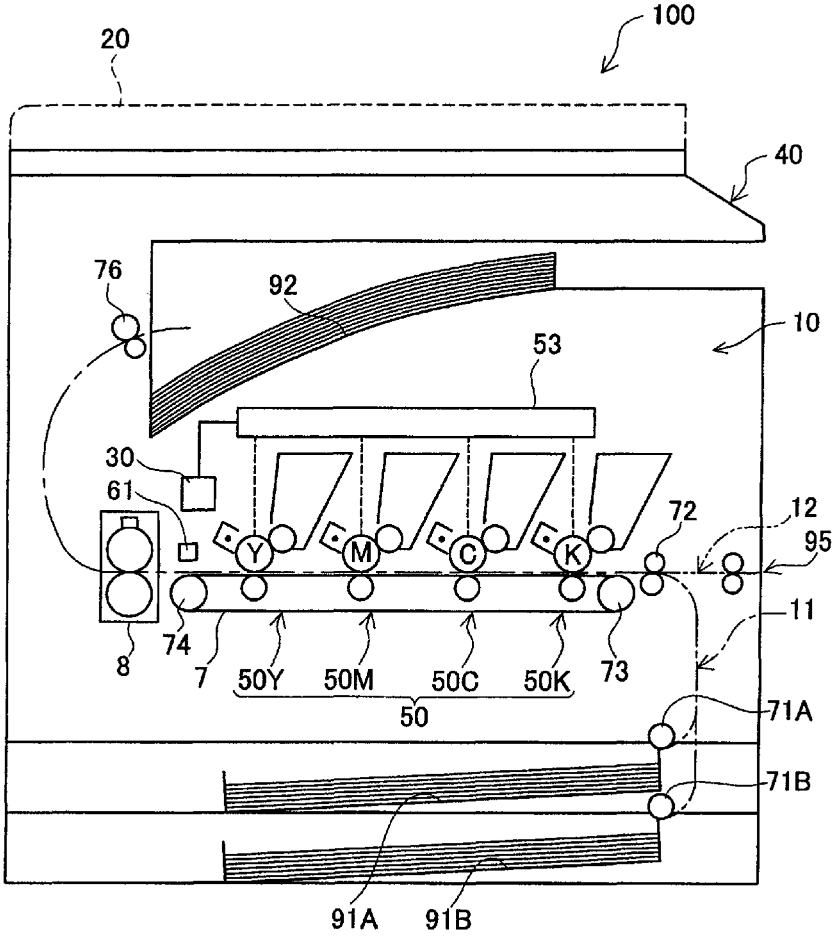
FIG. 2 is a schematic diagram to illustrate an internal configuration of the MFP according to the embodiment of the present invention.

The image forming unit 10 includes a feeding path 11, in which the sheets picked up from the sheet cassettes 91A, 91B by feed rollers 71A, 71B are conveyed to pass through a register roller 72, the processing unit 50, the fixing unit 8, and a discharge roller 76. The sheet conveyed in the feeding path 11 is ejected and directed to settle in the discharge tray 92. In FIG. 2, the feeding path 11 is indicated by a dotted line winding in a form of an S. Further, the image forming unit 10 includes a linear feeding path 12, which is indicated by double-dotted line in FIG. 2. Recording sheets can be fed in the linear feeding path 12 to be conveyed to the image forming unit 10 through the manual-feed inlet 95.

The processors 50Y, 50M, 50C, 50K are developer devices to develop toner images in a known electrophotographic method. Each of the processors 50Y, 50M, 50C, 50K includes a photosensitive body, a charger device, a developer device, and a transfer device. A surface of the photosensitive body is uniformly charged by the charger and exposed to the beams emitted from the exposure unit 53 to have a latent image corresponding to the image to be printed. Further, the latent image on the surface of the photosensitive body is supplied with toner by the developer device and developed to be a toner image.

The MFP 100 has the three sheet feeders, which are the sheet cassette 91A, the sheet cassette 91B, and the manual-feed inlet 95. The image forming unit 10 picks up the sheets stored in the sheet cassette 91A or 91B or inserted through the manual-feed inlet 95 one by one to convey on the conveyer belt 7 to the processor unit 50. The processor unit 50 fed with the sheet transfers the toner image developed in the processors 50Y, 50M, 50C, 50K to a surface of the sheet, and the sheet with the transferred image is forwarded to the fixing unit 8, in which the toner on the sheet is thermally fixed thereto. The sheet with the fixed image is conveyed further and ejected to be placed in the discharge tray 92. When a colored image is formed, toner images respectively formed by the processors 50Y, 50M, 50C, 50K are transferred to be overlaid on the surface of the sheet. When a monochrome image is formed, a toner image formed solely by the processor 50K is transferred on the surface of the sheet.

The image forming unit 10 in the present embodiment correct positions of the images in respective colors in order to avoid misalignment (color shift) of the CMYK color images on the sheet and attempt to improve quality of images being formed. Correction of positions of the color images is achieved by obtaining amounts (i.e., offset values) of assumed misalignment of the color images with respect to a reference image and adjusting the positions of the color images based on the obtained offset values.

A flow to obtain the offset values is conducted when predetermined conditions are met. The flow may be activated, for example, when a number of sheets having been printed after a previous obtainment of the offset values exceeds a predetermined number. For another example, the flow may be activated when the MFP 100 is powered on for a predetermined time period. With frequently obtained offset values, the color images, of which positions are more accurately corrected, are provided. Meanwhile, a flow to adjust the positions of the color images is conducted each time the color images are formed in the image forming unit 10.

The offset values can be obtained, for example, in a following flow. That is, firstly, each of the processors 50Y, 50M, 50C, 50K forms a toner image of a register pattern being a positional index. Secondly, the register patterns are respectively transferred onto the surface of the conveyer belt 7. Thus, a reference register pattern in a predetermined reference color (one of the CMYK colors) and register patterns in other colors (other than the reference color) are formed. In this regard, the positions of the four register patterns may not always coincide with one another due to, for example, misalignment of the components in a subsidiary direction and/or out-of-synchronization of the components. Thirdly, a mark sensor 61 detects the positions of the four register patterns. Fourthly, distances between the reference register pattern and the other register patterns are calculated. Thus, the amounts of assumed misalignment of the color images with respect to the reference image (i.e., the offset values) can be obtained.

The offset values may not necessarily be obtained in the above flow. Further, the offset values may be calculated additionally in consideration of misalignment in a main scanning direction. For another example, in order to further improve quality of images being formed, a flow to correct difference of densities in respective colors can be employed.

Electrical Configuration of the MFP

Figure 3:
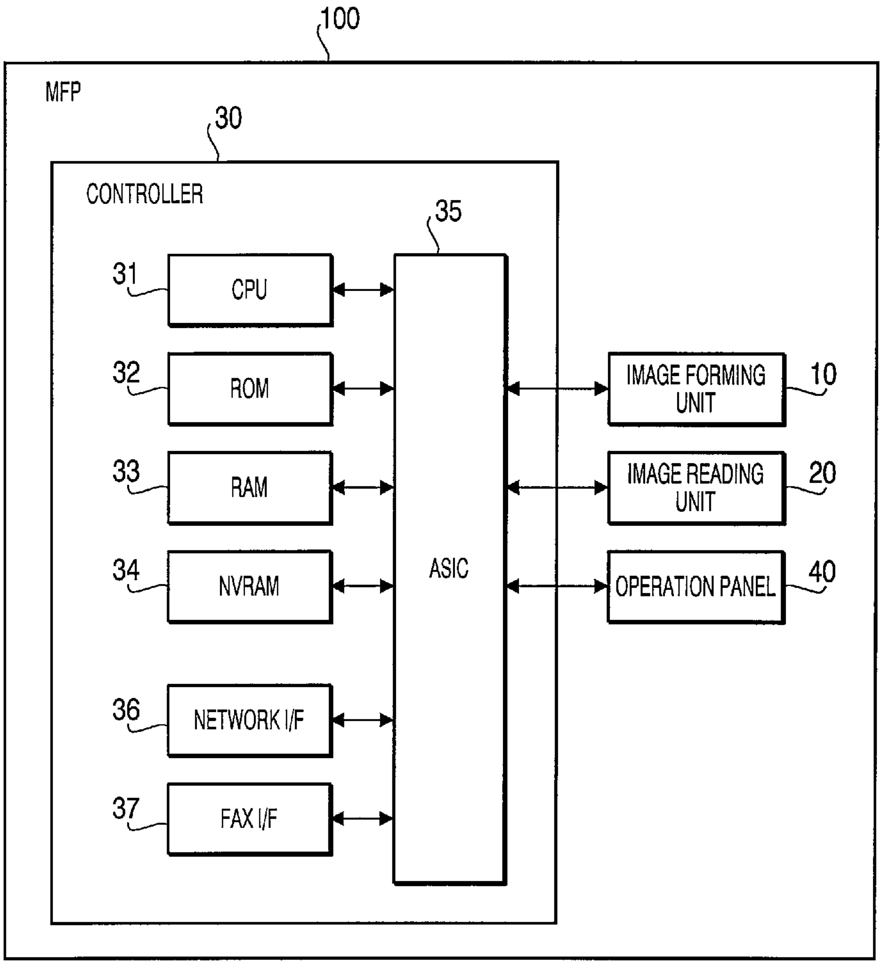
FIG. 3 is a block diagram to illustrate an electrical configuration of the MFP according to the embodiment of the present invention.

The electrical configuration of the MFP 100 will be described (see FIG. 3). The MFP 100 is provided with a controller unit 30, which includes a CPU 31, a ROM 32, a RAM 33, a non-volatile RAM (NVRAM) 34, an ASIC 35, a network interface (I/F) 36, and a FAX I/F 37. The controller unit 30 is electrically connected with the image forming unit 10, the image reading unit 20, and the operation panel 40.

The CPU 31 is an arithmetic processor, which processes information to be used to achieve functionalities of the MFP 100 including image reading, image forming, and print restriction. The ROM 32 stores programs to control the MFP 100 and information concerning operation settings and initial settings of the MFP 100. The RAM 33 serves as a work area, in which the controlling programs are loaded, and a memory area, in which image data is temporarily stored. The NVRAM 34 is a data storage, in which information concerning operation settings and image data can be stored.

The CPU 31 controls behaviors of the MFP 100 through the ASIC 35. In particular, the CPU 31 processes information from the controlling programs and signals obtained from various sensors and stores the information in the RAM 33 and the NVRAM 34 to drive components in the MFP 100. The CPU 31 controls, for example, timing for emitting light from the exposure unit 53, activation of a driving motor (not shown) to drive the rollers in the feeding paths 11, 12, and a driving motor (not shown) to move an image sensor unit (not shown) in the image reading unit 20.

The network I/F 36 connects the MFP 100 with networks, such as the Internet, to establish communication with other information processing apparatuses (e.g., personal computer) through the network. The FAX I/F 37 connects the MFP 100 with a telephone line to establish communication with other facsimile machines through the telephone line.

Print-Restricting Function

A print-restricting function of the MFP 100 will be described. The MFP 100 in the present embodiment can restrict execution of a print job when the MFP 100 recognize image-forming quality of the MFP 100 being lowered and the print job meets predetermined conditions.

In particular, the MFP 100 can continue printing to execute the print job even when the MFP 100 recognizes probability of the lowered image-forming quality. Therefore, when the MFP 100 continues printing, quality of the printed image may not be satisfactory to the user. Specifically, when the print job requires printing an image on a recording sheet of finer quality, and the quality of the printed image is not satisfactory, the recording sheet with the printed image may be wasted, and the waste may cause greater loss than a recording sheet of regular quality being wasted. Thus, in the present embodiment, the MFP 100 can determine as to whether the print job should be restricted on basis of a type of the recording sheet to be used in the print job.

The MFP 100 is provided with a database 320 (see FIG. 4), in which restriction and allowance settings on basis of the sheet-type attribute for a print job are registered. More specifically, the database 320 includes feeder-specific data 321, a size-specific data 322, and a material-specific data 323. The feeder-specific data 321 indicates restriction and allowance for a print job on basis of a sheet feeder (e.g., the sheet cassette 91A, the sheet cassette 91B, and the manual-feed inlet 95) to be used in the print job. The size-specific data 322 indicates restriction and allowance of a print job on basis of a size (e.g., letter size, an A4 size, and a legal size) of the recording sheet to be used in the print job regardless of the sheet feeder to be used. The material-specific data 323 indicates restriction and allowance for a print job on basis of a material (e.g., regular paper, cardboard, and an OHP film sheet) to be used in the print job regardless of the sheet feeder or the sheet size to be used in the print job. Restriction and allowance on basis of the sheet feeder, the sheet size, and the sheet material can be set and modified by a user through the operation panel 40.

When a print job is inputted, the MFP 100 examines the sheet-type attribute of the print job and determines as to whether the print job includes any restrictive sheet-type attribute, which is indicated to be restricted in the database 320. If the print job includes the restrictive sheet-type attribute, the MFP 100 restricts execution of the print job.

The MFP 100 may immediately cancel the print job or may enter an inquiry mode, in which the MFP 100 asks the user as to whether the print job should be canceled or maintained, prior to actual cancelation of the print job. The user may input an option during the inquiry mode. In this regard, additionally to the options of maintaining the print job and cancelling the print job, the user may opt to modify the print job. The inquiry mode may be set on basis of the print job; alternatively, the MFP 100 may be configured to run in the inquiry mode at all times.

Flow of Print Job Management

A flow of print job management, in which the print job is judged as above and processed, will be described with reference to FIG. 5. The print job management flow is activated upon entry of a print job, which includes forming an image on a recording sheet (e.g., producing a copied image).

When the flow starts, in S101, the MFP 100 judges as to whether the print job requires printing images on multiple (two or more) recording sheets. When the print job requires printing an image on solely a single recording sheet (S101: NO), the flow proceeds to S106, in which the print job is executed and the image is printed on the single recording sheet regardless of the quality of image-printing of the MFP 100. In other words, in the flow from S101 through S106, the image is printed even when the image-printing quality of the MFP 100 is lowered; therefore, the user may find the quality of the printed image being unsatisfactory. However, according to the flow, damage which may be caused by the failed printing operation is relatively small: solely the single recording sheet. Further, the smaller damage may be necessary to find out a worsened printing condition of the MFP 100. Therefore, after the judgment in S101, when the print job requires a single recording sheet, the print job is maintained to be executed. The flow ends thereafter.

In S101, when the print job requires a plurality of recording sheets (S101: YES), the flow proceeds to S102 to avoid greater loss of the recording sheets.

Figure 6:
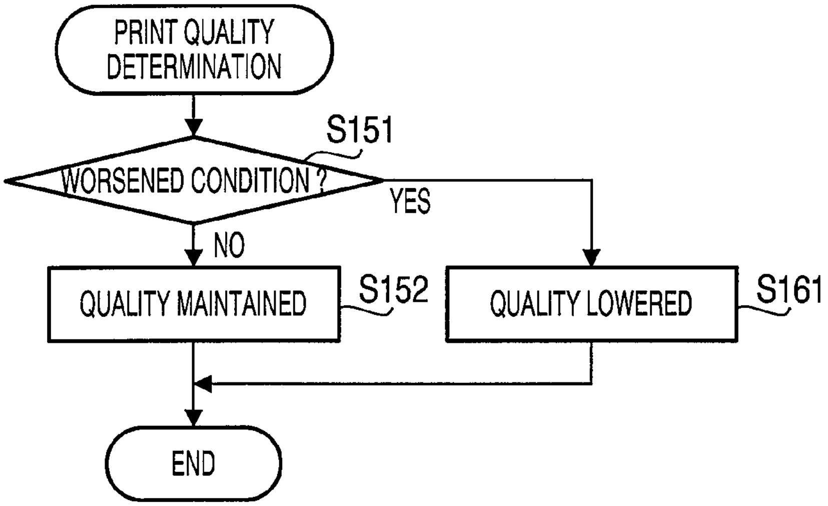
FIG. 6 illustrates a print quality determination flow of the MFP according to the embodiment of the present invention.

In S102, the MFP 100 examines the quality of image-printing of the MFP 100 itself. More specifically, a flow of print quality determination (see FIG. 6) is conducted. In the print quality determination flow, in S151, the MFP 100 examines as to whether the MFP 100 is under condition of lowered image-printing quality. When the condition for image-printing is maintained and not worsened (S151: NO), the flow proceeds to S152, in which the MFP 100 determines that the image-printing quality is maintained. When the condition for image-printing is worsened (S151: YES), the flow proceeds to S161, in which the MFP 100 determines that the image-printing quality is lowered.

The condition of image-printing may be determined by referring to predetermined criteria. For example, firstly, the MFP 100 may examine a remaining amount of toner in the processor unit 50. When a level of the remaining toner is lower than a predetermined level, the latent image may not steadily be developed throughout the print job. Secondly, the MFP 100 may examine as to whether the offset values to correct misalignment of the CMYK color images have not been obtained for a predetermined period of time and/or when it is shortly before the offset values are obtained. After a longer period of time from the last obtainment of the offset values, amounts of the misalignment of the CMYK color images may be greater, and the last-obtained offset values may not serve effectively to correct the misalignment. Thirdly, the MFP 100 may examine as to whether environmental factors (e.g., temperature and humidity conditions) surrounding the MFP 100 is out of a normal range. The environmental factors out of the normal range may affect to lower quality of the printed image.

In the present embodiment, when at least one of the three criteria is met, the MFP 100 determines that the MFP 100 is under the condition of lowered image-printing quality. However, the determination of the lowered image-printing quality may not necessarily be made based on the above mentioned criteria.

Figure 5:
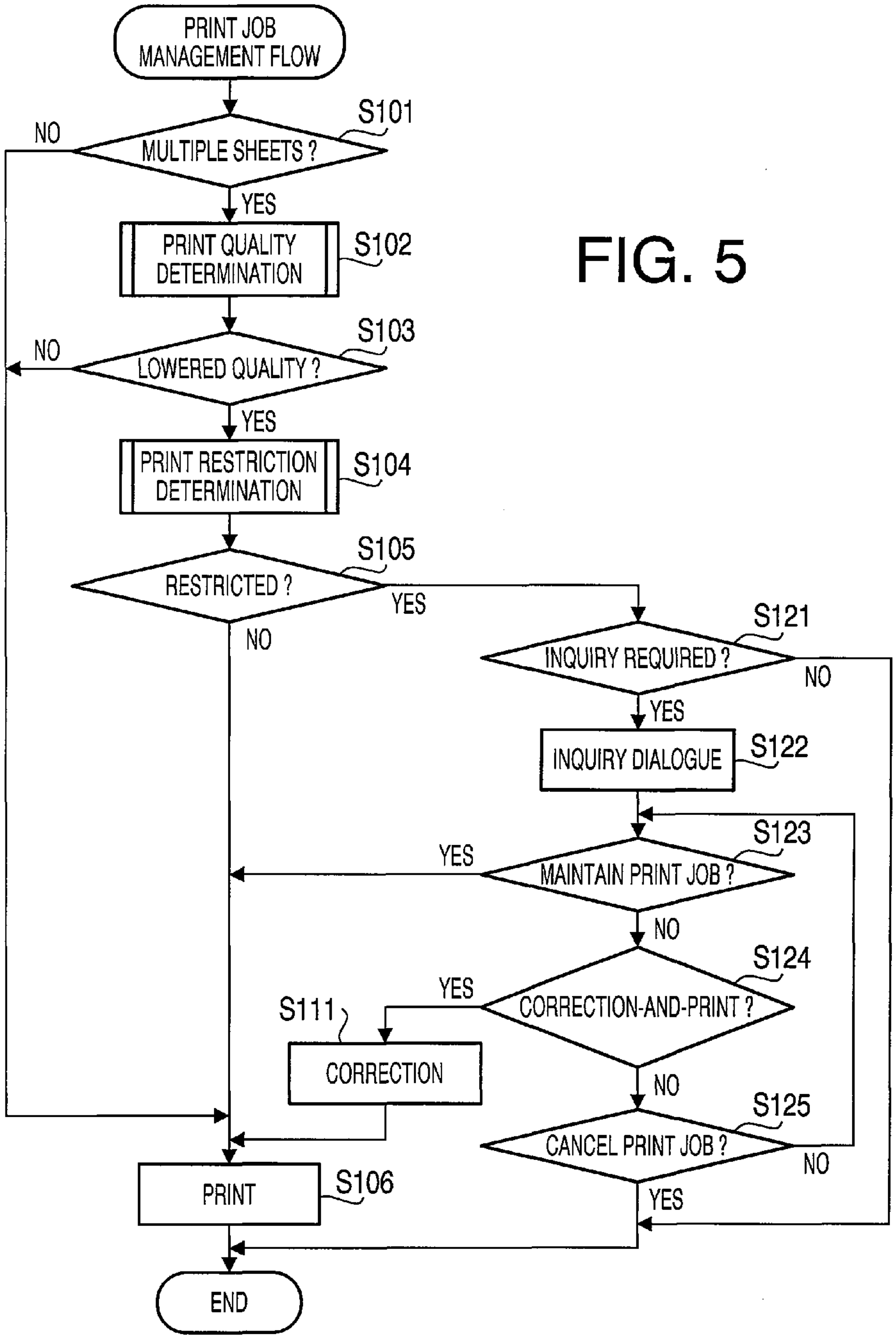
FIG. 5 illustrates a print job management flow of the MFP according to the embodiment of the present invention.

The flow returns to the print job management flow shown in FIG. 5. In S103, the MFP 100 judges as to whether the quality of image-printing has been lowered based on the determination in S102. If the image-printing quality is maintained (S103: NO), the flow proceeds to S106, in which the print job is executed and the image is printed on the plurality of recording sheets without restriction.

Figure 7:
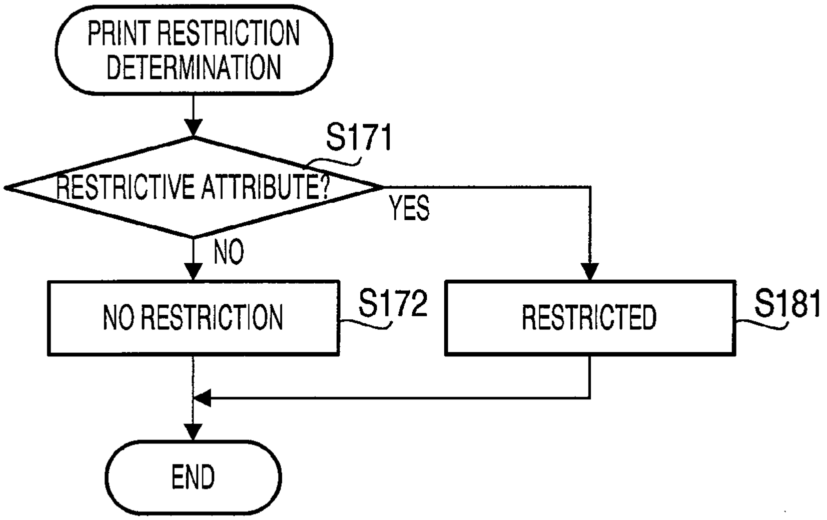
FIG. 7 illustrates a print restriction determination flow of the MFP according to the embodiment of the present invention.

In S103, if the image-printing quality is lowered (S103: YES), the flow proceeds to S104. In S104, the MFP 100 examines the attribute of the print job and determines as to whether the print job meets a requirement to be restricted. More specifically, a flow of print restriction determination (see FIG. 7) is conducted. In the print restriction determination flow, the MFP 100 refers to the feeder-specific data 321, the size-specific data 322, and the material-specific data 323 in the database 320 and determines as to whether the print job includes at least one restrictive sheet-type attribute, which is indicated to be restricted in the data 321, 322, 323. If the print job does not include any restrictive sheet-type attribute (S171: NO), the flow proceeds to S172, in which the MFP 100 determines that the print job does not meet the requirement to be restricted. In S171, if the print job includes at least one restrictive sheet-type attribute (S171: YES), the flow proceeds to S181, in which the MFP 100 determines that the print job meets the requirement to be restricted.

In the present embodiment, when at least one of the three characteristics of the sheet-types is included in the attribute of the print job, the MFP 100 determines that the print job is to be restricted. However, the determination of the restricted print job may not necessarily be made based on the above mentioned characteristics as long as restriction and allowance of the print job can be determined. Additionally or alternatively, restriction and allowance of the print job can be determined based on different characteristics (e.g., data types of the image data) of the print job.

The flow returns to the print job management flow shown in FIG. 5. Following S104, in S105, the MFP 100 judges as to whether the print job is restricted based on the determination in S104. If the print job is allowed without the restriction (S105: NO), the flow proceeds to S106, in which the print job is executed and the image is printed on the plurality of recording sheets without restriction. In S106, the printed image may be in the lowered quality; however, it is likely that the user allowing the print job is aware of the lowered quality of image-printing. Therefore, the printed images may not necessarily be discarded but may be used efficiently. In other words, loss of the recording sheets may be avoided.

In S105, if the MFP 100 judges that the print job is restricted (S105: YES), in S121, the MFP 10 judges as to whether the MFP 100 is in the inquiry mode. The inquiry mode may be set on basis of the print job; alternatively, the MFP 100 may be configured to run in the inquiry mode at all times. When the MFP 100 is not in the inquiry mode (S121: NO), the MFP 100 cancels the print job, and the flow ends thereafter. When the MFP 100 is not in the inquiry mode, the cancellation of the print job may not appear to the user. Therefore, the user may be informed of the cancellation through the display unit 41.

Figure 8:
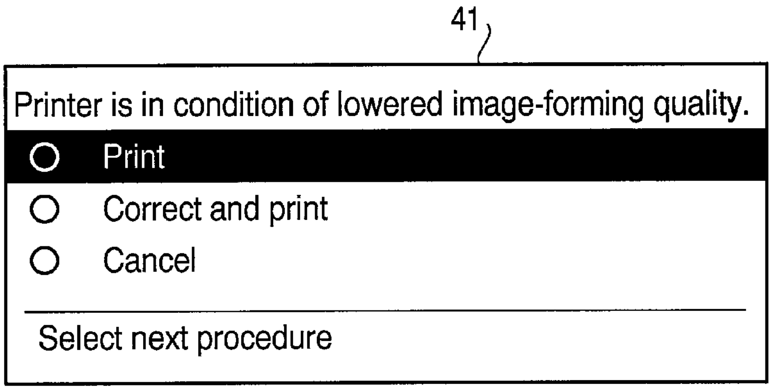
FIG. 8 is an illustrative view of a dialogue window to be displayed in the print job management flow in the MFP according to the embodiment of the present invention.

When the MFP 100 is in the inquiry mode (S121: YES), in S122, the MFP 100 displays a dialogue window (see FIG. 8), through which the user's preference is entered, on the display unit 41. The dialogue window presents at least options of maintaining the print job and cancellation of the print job and asks the user as to whether the print job should be maintained or canceled.

Additionally to the two options, the dialogue window may present the user a third option, which is updating the offset values to improve the quality of image-printing and printing the image according to the updated offset values. By the correction-and-print option, the offset values can be updated, and the once-lowered image-printing quality may be improved. Thus, the result of the print quality judgment may be effectively reflected. The behavior of the MFP 100 to improve the quality of image-printing based on the third option may vary according to the detected condition of the MFP 100. For example, in S151, the correction-and-print option may be presented to the user through the dialogue window when the MFP 100 judges that the offset values to improve the image-printing quality have not been obtained for a predetermined period of time in S151 (S151: YES). Meanwhile, in S151, the correction-and-print option may not be presented to the user or unselectively displayed (e.g., in-grey appearance) to the user when the MFP 100 judges that the level of remaining toner is lower than the predetermined level, since the level of remaining toner should be manually improved by hands of the user and cannot be improved by the MFP 100 alone.

Following S122, the MFP 100 waits for the user's input. When the user enters the preference, in S123, the MFP 100 judges as to whether the preference is maintaining the print job and printing the image. If the user's preference is maintaining the print job (S123: YES), the flow proceeds to S106, in which the print job is released from the restriction and the image is printed on the plurality of recording sheets. In S106, the printed image may be in the lowered quality; however, it is likely that the user releasing the print job is aware of the lowered quality of image-printing. Therefore, the printed images may not necessarily be discarded but may be used efficiently. In other words, loss of the recording sheets may be avoided.

If the user's preference is not maintaining the print job (S123: NO) but correction-and-print (S124: YES), the flow proceeds to S111, in which the offset values are updated. Thereafter, the flow proceeds to S106, in which the images are printed according to the updated offset values. In this regard, the quality of the printed images may be improved to be higher than the image-printing quality which may be achieved in the print job maintained and processed via the affirmative judgment in S123 (S123: YES). In other words, the quality of the printed images may be satisfactory to the user.

If the user's preference is not correction-and-print (S124: NO) but cancelling the print job (S125: YES), the MFP 100 aborts the print job without printing an image. The flow ends thereafter. If no preference is entered (S125: NO), the flow returns to S123. If no preference is entered after a predetermined period of time, the MFP 100 may forcibly cancel the print job and terminate the flow.

In the above-described flow, the print job is suspended whilst the MFP 100 waits for the user's preference. Whilst the print job is on hold, the user may supply toner and/or recording sheets in the MFP 100 to improve the condition of the MFP 100. Therefore, in S151, when the MFP 100 judges that the image-print quality is lowered by the lowered level of remaining toner, the MFP 100 may display a message for toner supply to the user in S122. Additionally, when the supplied toner is detected, the MFP 100 may restart the print job.

According to the MFP 100 in the above-described embodiment, the print job can be cancelled forcibly or according to the user's preference and restricted from being executed when the lowered image-printing quality is detected and when the print job requires a specific type of sheets in limited printing condition (e.g., a specific type of sheet feeder, a sheet size, and a sheet material). Therefore, the print job requiring the specific type of sheets may be prevented from being executed when the printing condition is not necessarily secured. Accordingly, wasteful use of the specific type of sheets can be reduced.

According to the above configuration, based on the attribute of the print job indicating the recording sheet to be used in the print job, a print job requiring the specific recording sheet registered in the database 320 can be restricted from being executed so that wasteful use of the specific recording sheet can be reduced. The restriction may be specifically effective when a recording sheet of higher quality is registered as the specific recording sheet. Additionally, whilst the print job requiring the specific type of recording sheet is restricted, the toner which may be in the condition of lower image-forming quality is prevented from being used in the print job requiring the higher-quality type of recording sheet. In other words, the toner in the printing apparatus may be efficiently used in the print job which can be executed under the condition of lowered image-forming quality According to the above configuration, the user can register the specific type of recording sheet as the restricted type or the allowed type in the database 320 according to the user's preference, and usability of the MFP 100 is improved.

According to the above configuration, the print job can be executed entirely even when the print job meets the restrictive requirement. Therefore, the image can be printed effectively when an image in lowered image-forming quality is accepted.

According to the above configuration, a print job may be effectively restricted from being executed when at least one of the conditions of the toner, the register pattern image forming condition, and the environmental factor is not at a level of allowable image-forming quality.

According to the above configuration, when a print job requires a plurality of recording sheets, that is, when a plurality of recording sheets may be wasted due to the condition of lower image-forming quality, the print job may be restricted. Meanwhile, when a print job requires a single recording sheet, solely one recording sheet may be wasted. In other words, the print job, which may result in the smaller loss, may be released to be executed.

According to the above configuration, the print job may be executed after correction to improve the image-forming quality is conducted.

Although an example of carrying out the invention has been described, those skilled in the art will appreciate that there are numerous variations and permutations of the printing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the present invention can be similarly effectively applied to other printing apparatuses having a plurality of sheet feeders, such as a printer and a copier. Further, the image forming unit in the printing apparatus may not necessarily form images electro-photographically, but may form in, for example, inkjets. Furthermore, the printing apparatus may be either a multi-color printing apparatus or a monochrome printing apparatus.

The quality of image-printing may not necessarily be determined based on the remaining amount of toner, updating status of the offset values, or environmental condition but may be determined based on other indexes which may indicate the quality of image-printing. For example, the MFP 100 may determine the image-printing quality is lowered when obtained offset values to correct color shifts and uneven densities of the colored images exceed predetermined normal ranges whilst the out-of-range offset values may not serve effectively to correct accumulated printing errors. The offset values may exceed the predetermined normal ranges when, for example, the conveyer belt 7 is damaged and the mark sensor 61 cannot detect the register patterns. For another example, the offset values may exceed the predetermined normal ranges when the photosensitive body of the processor 50Y, 50M, 50C, or 50K is damaged and incapable of correctly forming the register patterns on the conveyer belt 7. For another example, furthermore, the lowered image-forming quality may be determined based on a number of recording sheets having been used after a last toner cartridge exchange.

Moreover, the print job may not necessarily be restricted on basis of the type of the recording sheet to be used but may be restricted on basis of any other characteristics of the print job. For example, the MFP 100 may examine a type of the image in the print job, and when the image includes a larger-sized picture image, which may be largely affected by running-out toners, the print job may be restricted and cancelled. If the image includes a document, which may not be largely affected by the running-out toners but may be printed to be substantially readable, the print job may be allowed and maintained.

In the above-described embodiment, the MFP 100 asks the user as to whether the print job should be cancelled or maintained when the print job is judged to be restricted in S105. In this regard, additionally to the options of cancellation and maintaining, the user may be provided with an option of trial-print mode, in which solely a part of the print job (e.g., a front page only) is printed. When the user prefers the trial-print mode, the MFP 100 may print the front page and asks the user as to whether the following pages should be printed after completion of printing the front page. The user may examine the front page and selects as to whether the print job should be maintained or aborted based on the quality of the printed image on the front page. Although the front page may be discarded by the user when the user decides to abort the print job after viewing the front page, the remaining pages are prevented from being wastefully printed, and wasteful use of the sheets and toner can be moderated.

In the above-described embodiment, the MFP 100 receives the print instruction and thereafter judges the image-printing quality and restriction of the print job. However, a printing system having a printing apparatus, which prints images, and an external information transmitting device (e.g., a PC), which conducts the print job management flow. That is, for example, the MFP 100 may receive the print job from a PC, and the PC may obtain the information (e.g., information concerning the printing condition of the MFP 100, such as the level of remaining toner and the updating status of the offset values) to be referred to for the judgment. Further, the PC may judge the image-printing quality and restriction of the print job. Additionally, the PC may ask the user as to whether the print job should be maintained, corrected-and-printed, or cancelled.

What is claimed is:

1. A printing apparatus capable of processing a print job and forming an image on a recording sheet based on the print job, comprising:

a processor; and memory storing computer readable instructions that, when executed, cause the printing apparatus to function as:

a first determining system configured to examine an image-forming condition of the printing apparatus and determine as to whether the printing apparatus is under a condition of lowered image-forming quality;

a second determining system configured to examine an attribute of the print job and determine, based on the attribute, whether the print job requires a predetermined level of image-forming quality, which is higher than the lowered image-forming quality, when the first determining system determines that the printing apparatus is under the condition of the lowered image-forming quality; and a restricting system configured to:

restrict execution of the print job at least partially when the first determining system determines that the printing apparatus is under the condition of the lowered image-forming quality and the second determining system determines that the print job requires the predetermined level of image-forming quality, which is higher than the lowered image-forming quality; and not restrict execution of the print job when the first determining system determines that the printing apparatus is not under the condition of the lowered image-forming quality or the second determining system determines that the print job does not require the predetermined level of image-forming quality, which is higher than the lowered image-forming quality.

2. The printing apparatus according to claim 1, wherein the second determining system determines that the print job does not require the predetermined level of image-forming quality, higher than the lowered image-forming quality, when the attribute indicates that the print job requires a first type of recording sheet, which allows the print job to be executed, even when the printing apparatus is determined to be under the condition of the lowered image-forming quality; and wherein the second determining system determines that the print job requires the predetermined level of image-forming quality, higher than the lowered image-forming quality, when the print job requires a second type of recording sheet, which restricts the print job from being executed.

3. The printing apparatus according to claim 2, wherein the computer readable instructions, when executed, further cause the printing apparatus to function as:

a registration system, in which the first type of recording sheet and the second type of recording sheet defined by a user are registered.

4. The printing apparatus according to claim 2, wherein the attribute of the print job to be examined by the second determining system includes at least one of a sheet feeder, a sheet size, and a sheet material to be used in the print job to form the image on the recording sheet.

5. The printing apparatus according to claim 1, wherein the computer readable instructions, when executed, further cause the printing apparatus to function as:

a releasing system configured to release the print job from being restricted by the restricting system and to allow the print job to be entirely executed irrespective of the determination of the second determining system that the print job requires the predetermined level of image-forming quality, higher than the lowered image-forming quality.

6. The printing apparatus according to claim 1, wherein the first determining system is configured to determine the lowered image-forming quality of the printing apparatus based on at least one of:

an amount of colorant remaining in the printing apparatus;

a pattern-image forming condition for forming an index pattern, which is used to adjust a position of the image; and an environmental factor including at least one of temperature and humidity.

7. The printing apparatus according to claim 1, wherein the restricting system is configured to restrict an entirety of the print job from being executed when the print job requires a plurality of recording sheets to be used for forming the image; and wherein the restricting system is configured to release the print job from restriction when the print job requires a single recording sheet to be used for forming the image.

8. The printing apparatus according to claim 1, wherein the computer readable instructions, when executed, further cause the printing apparatus to function as:

a post-improvement image forming system configured to execute the print job after an improving process, the improving process configured to attempt to improve the condition of the lowered image-printing quality, when the first determining system determines that the printing apparatus is under the condition of the lowered image-forming quality.

9. A printing system having an information transmitting device and a printing apparatus capable of processing a print job transmitted from the information transmitting device and forming an image on a recording sheet based on the print job, comprising:

a processor; and memory storing computer readable instructions that, when executed, cause the printing apparatus to function as:

a first determining system configured to examine an image-forming condition of the printing apparatus and determine as to whether the printing apparatus is under a condition of lowered image-forming quality;

a second determining system configured to examine an attribute of the print job and determine based on the attribute as to whether the print job requires a predetermined level of image-forming quality, which is higher than the lowered image-forming quality, when the first determining system determines that the printing apparatus is under the condition of the lowered image-forming quality; and a restricting system configured to:

restrict execution of the print job when the first determining system determines that the printing apparatus is under the condition of the lowered image-forming quality and the second determining system determines that the print job requires the predetermined level of image-forming quality, which is higher than the lowered image-forming quality; and not restrict execution of the print job when the first determining system determines that the printing apparatus is not under the condition of the lowered image-forming quality or the second determining system determines that the print job does not require the predetermined level of image-forming quality, which is higher than the lowered image-forming quality.

* * * * *